United States Patent
Kurimura et al.

(10) Patent No.: US 7,714,067 B2
(45) Date of Patent: May 11, 2010

(54) BLOCK COPOLYMER MIXTURE CONTAINING STAR-BRANCHED BLOCK COPOLYMER

(75) Inventors: Hiroyuki Kurimura, Tokyo (JP); Jun Watanabe, Tokyo (JP); Takeshi Ootsuka, Tokyo (JP); Shigeru Suzuki, Tokyo (JP); Takeshi Oda, Tokyo (JP); Norihiro Shimizu, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 200 days.

(21) Appl. No.: 10/549,572

(22) PCT Filed: Mar. 19, 2004

(86) PCT No.: PCT/JP2004/003752
§ 371 (c)(1), (2), (4) Date: Sep. 19, 2005

(87) PCT Pub. No.: WO2004/083269
PCT Pub. Date: Sep. 30, 2004

(65) Prior Publication Data
US 2006/0211818 A1      Sep. 21, 2006

(30) Foreign Application Priority Data
Mar. 19, 2003    (JP) .............................. 2003-075468

(51) Int. Cl.
*C08L 53/02* (2006.01)
(52) U.S. Cl. .................... 525/89; 525/99; 525/250; 525/271; 525/314; 525/98
(58) Field of Classification Search .................. 525/98, 525/99, 250, 271, 314, 88, 89
See application file for complete search history.

(56) References Cited

U.S. PATENT DOCUMENTS

| | | | |
|---|---|---|---|
| 3,639,517 A | 2/1972 | Kitchen et al. | |
| 4,086,298 A | 4/1978 | Fahrbach et al. | |
| 4,091,053 A | 5/1978 | Kitchen | |
| 4,120,915 A | 10/1978 | Fodor et al. | |
| 4,418,180 A | 11/1983 | Heinz et al. | |
| 5,393,838 A * | 2/1995 | Moczygemba et al. | ........ 525/98 |
| 5,436,298 A | 7/1995 | Moczygemba et al. | |
| 5,438,103 A | 8/1995 | DePorter et al. | |
| 5,705,569 A * | 1/1998 | Moczygemba et al. | ...... 525/314 |
| 5,854,353 A | 12/1998 | Knoll et al. | |

FOREIGN PATENT DOCUMENTS

| | | |
|---|---|---|
| EP | 0 316 671 A2 | 5/1989 |
| EP | 0 646 607 A2 | 4/1995 |
| JP | 64-81844 | 3/1989 |
| JP | 3-26747 | 2/1991 |
| JP | 7-228647 | 8/1995 |
| JP | 8-231659 | 9/1996 |
| JP | 2000-26698 | 1/2000 |

OTHER PUBLICATIONS

U.S. Appl. No. 10/566,372, filed Jan. 30, 2006, Watanabe et al.
Kraus et al, Adv. Chem. Ser. (1979), vol. 176, pp. 277-292.
Hsieh et al, Rubber Chemistry and Technology, (1970), vol. 43, No. 1, pp. 22-73.
Knoll et al, Macromol. Symp., (1998), vol. 132, pp. 231-243.

* cited by examiner

*Primary Examiner*—Jeffrey C Mullis
(74) *Attorney, Agent, or Firm*—Oblon, Spivak, McClelland, Maier & Neustadt, L.L.P.

(57) ABSTRACT

A block copolymer mixture containing a branched block copolymer characterized in that it has at least three types of polymer blocks with different molecular weights, each comprising a vinyl aromatic hydrocarbon as monomer units, the molecular weight distribution of a mixture of the polymer blocks S1, S2 and S3 each comprising a vinyl aromatic hydrocarbon as monomer units is within a specific range, and in a gel permeation chromatogram of the mixture of three types of the polymer blocks S1, S2 and S3, M1/M3 and M2/M3 are within specific ranges, where M1, M2 and M3 are peak top molecular weights of the respective polymer blocks.

26 Claims, 1 Drawing Sheet

BLOCK COPOLYMER MIXTURE CONTAINING STAR-BRANCHED BLOCK COPOLYMER

TECHNICAL FIELD

The present invention relates to a block copolymer mixture containing a novel branched block copolymer comprising a conjugated diene and a vinyl aromatic hydrocarbon compound. Particularly, it relates to a block copolymer mixture containing a branched block copolymer excellent in transparency and impact resistance and useful as a block copolymer mixture by itself or as blended with another thermoplastic resin.

BACKGROUND ART

A block copolymer comprising a vinyl aromatic hydrocarbon and a conjugated diene and having a relatively high content of the vinyl aromatic hydrocarbon is widely used for an application to injection molding or for an application to extrusion, such as sheets and films, by virtue of its excellent characteristics such as transparency and impact resistance. Particularly, some such block copolymers and styrene polymer compositions having such a block copolymer blended therewith, which are excellent in transparency, impact resistance, etc., have been proposed.

For example, JP-A-53-000286 discloses a branched block copolymer wherein the ratio of the number average molecular weight of a high molecular weight component to a low molecular weight component is from 3 to 7 in a vinyl-substituted aromatic hydrocarbon block in two linear copolymers prior to coupling, and its production process. JP-A-07-173232 discloses a branched block copolymer having at least three polymer blocks each comprising a vinyl aromatic hydrocarbon as monomer units, and its production process. Further, JP-A-52-078260 discloses a linear copolymer composition wherein the molecular weight distribution at a vinyl-substituted aromatic hydrocarbon block moiety is from 2.3 to 4.5, and a branched block copolymer composition wherein the molecular weight distribution at a vinyl-substituted aromatic hydrocarbon block moiety is from 2.8 to 3.5, which is produced by blending. Still further, JP-A-57-028150 discloses a method of combining a branched block copolymer wherein the molecular weight distribution at a vinyl aromatic hydrocarbon block moiety is out of the range of from 2.8 to 3.5.

However, such block copolymers and compositions of such a block copolymer with a thermoplastic resin formed by the above methods, are poor in balance of transparency, impact resistance, etc. Particularly, in injection molding, molding is carried out under a high shearing force, whereby a molded product is likely to have an anisotropy and tends to be poor in strength in a certain direction, and a sufficient molded product can hardly be provided.

DISCLOSURE OF THE INVENTION

Under these circumstances, the present inventors have conducted extensive studies to obtain a block copolymer composition excellent in balance of transparency, impact resistance, etc. in the form of not only an extruded product and a blow molded product but also an injection molded product and as a result, found that the impact resistance is extremely improved without deteriorating transparency even in the form of an injection molded product by a block copolymer mixture containing a branched block copolymer characterized in that it has at least three types of polymer blocks with different molecular weights, each comprising a vinyl aromatic hydrocarbon as monomer units, the molecular weight distribution of a mixture of polymer blocks S1, S2 and S3 each comprising a vinyl aromatic hydrocarbon as monomer units (their number average molecular weights S1>S2>S3) is within a specific range, and in a gel permeation chromatogram of the mixture of the at least three polymer blocks S1, S2 and S3, M1/M3 and M2/M3 are within specific ranges, where M1, M2 and M3 are peak top molecular weights of components corresponding to S1, S2 and S3, respectively. The present invention has been accomplished on the basis of this discovery.

Namely, the present invention provides a block copolymer mixture containing a branched block copolymer as the main component, characterized in that the block copolymer mixture comprises from 55 to 95 parts mass % of a vinyl aromatic hydrocarbon and from 5 to 45 mass % of a conjugated diene as monomer units, a linear block copolymer prior to coupling is formed by coupling a living active site represented by the following formulae:

S1-B—Li 

S2-B—Li 

S3-B—Li 

(wherein each of S1, S2 and S3 is a polymer block comprising a vinyl aromatic hydrocarbon as monomer units, B is a polymer block comprising a conjugated diene as monomer units, and Li is a living active site comprising lithium, and the number average molecular weights are S1>S2>S3), and further, (1) molecular weight distribution (Mw/Mn) of a mixture of the polymer blocks S1, S2 and S3 each comprising a vinyl aromatic hydrocarbon as monomer units is within a range of from 3.25 to 6, and (2) in a gel permeation chromatogram of the mixture of the polymer blocks S1, S2 and S3, M1/M3 is within a range of from 13 to 25, and M2/M3 is within a range of from 2 to 4, where M1, M2 and M3 are peak top molecular weights of components corresponding to S1, S2 and S3, respectively.

DETAILED DESCRIPTION OF THE DRAWINGS

In FIG. 1, each of x and y is an integer of at least 0, P is 1, 2 or 3, and R is a polymer chain.

In FIG. 2, each of x and y is an integer of at least 0, P is 1, 2 or 3, and R is a polymer chain.

In FIG. 3, molecular weight distribution and proportion of area are as follows.

Figure 1:
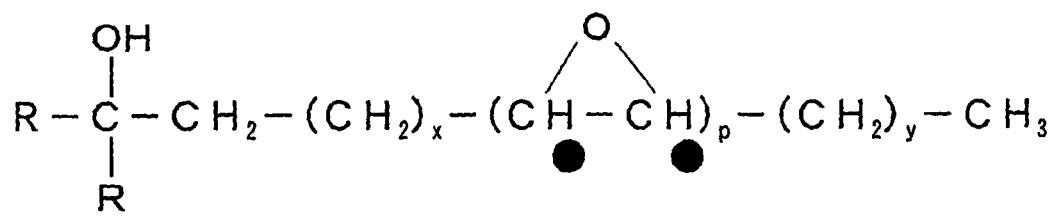
FIG. 1 illustrates methine protons (protons with marks ●) derived from an epoxy group present in an epoxidized oil residue.

Molecular weight distribution: a molecular weight distribution (Mw/Mn) of a peak obliquely lined portion) at which the peak top molecular weight becomes minimum among peaks (a) at which the peak top molecular weight is within a range of from 20,000 to 50,000 and (b) which form a proportion of the area of from 3 to 15% to the whole peak area. Proportion of area: the proportion of the peak (horizontally lined portion) at which the top molecular weight becomes maximum among peaks at which the peak top molecular weight is within a range of from 200,000 to 380,000, to the whole peak area.

BEST MODE FOR CARRYING OUT THE INVENTION

The branched block copolymer in the present invention means a star shaped polymer formed by bonding one terminals of linear polymer chains, usually called a star polymer or a radial polymer. The block copolymer of the present invention is branched and thereby has such an advantage as excellent moldability.

The vinyl aromatic hydrocarbon used for the block copolymer mixture containing a branched block copolymer of the present invention may, for example, be styrene, o-methylstyrene, p-methylstyrene, p-tert-butylstyrene, 1,3-dimethylstyrene, α-methylstyrene, vinylnaphthalene or vinylanthracene, and styrene may be mentioned as a preferred example. They may be used alone or as a mixture of two or more of them.

The conjugated diene is a diolefin having 4 or 8 carbon atoms and having a pair of conjugated double bonds, and it may, for example, be 1,3-butadiene, 2-methyl-1,3-butadiene (isoprene), 2,3-dimethyl-1,3-butadiene, 1,3-pentadiene or 1,3-hexadiene. 1,3-Butadiene or isoprene may be mentioned as a preferred example. They may be used alone or as a mixture of two or more of them.

The block copolymer mixture containing a branched block copolymer of the present invention comprises from 55 to 95 mass % of a vinyl aromatic hydrocarbon and from 5 to 45 mass % of a conjugated diene as monomer units, based on the total mass of the copolymer mixture. If the block copolymer mixture containing a branched block copolymer comprises a vinyl aromatic hydrocarbon in an amount exceeding 95 mass % and a conjugated diene in an amount less than 5 mass % as monomer units, it tends to be poor in impact resistance. On the other hand, if the block copolymer mixture containing a branched block copolymer comprises a vinyl aromatic hydrocarbon in an amount less than 55 mass % and a conjugated diene in an amount exceeding 45 mass % as monomer units, it tends to be poor in transparency, moldability, rigidity, heat stability, etc.

The block copolymer mixture containing a branched block copolymer preferably comprises from 60 to 85 mass % of a vinyl aromatic hydrocarbon and from 15 to 40 mass % of a conjugated diene as monomer units, based on the total mass of the copolymer, whereby it tends to have more favorable balance of impact resistance and transparency. Further, the block copolymer mixture containing a branched block copolymer more preferably comprises from 65 to 75 mass % of a vinyl aromatic hydrocarbon and from 25 to 35 mass % of a conjugated diene as monomer units, whereby it tends to have furthermore favorable balance of physical properties such as impact resistance, transparency and moldability.

The block copolymer mixture containing a branched block copolymer of the present invention is formed by coupling living active sites represented by the following formulae:

$$S1-B-Li$$

$$S2-B-Li$$

$$S3-B-Li$$

wherein each of S1, S2 and S3 is a polymer block comprising a vinyl aromatic hydrocarbon as monomer units, B is a polymer block comprising a conjugated diene as monomer units, and Li is a living active site comprising lithium, and the number average molecular weights are S1>S2>S3.

Namely, the block copolymer mixture containing a branched block copolymer has at least three types of specific polymer blocks with different number average molecular weights, each comprising a vinyl aromatic hydrocarbon as monomer units, whereby the block copolymer mixture containing a branched block copolymer of the present invention is very excellent in balance of physical properties such as impact resistance, transparency and moldability. Further, the mixture having three types of polymer blocks has favorable compatibility with a styrene resin such as a polystyrene, whereby a resin composition obtained by mixing the block copolymer mixture containing a block copolymer with a styrene resin will also be excellent in balance of physical properties such as impact resistance, transparency and moldability. As mentioned above, it is essential that the block copolymer mixture of the present invention contains at least three types of specific polymer blocks with different molecular weights each comprising a vinyl aromatic hydrocarbon as monomer units.

In addition, a conjugated diene polymer block structure formed by coupling polymer chains of the above formulae each comprising a polymer block S comprising a vinyl aromatic hydrocarbon as monomer units and a polymer block B comprising a conjugated diene as monomer units, is introduced into the branched block copolymer, whereby the block copolymer mixture containing such a branched block copolymer and a mixed resin composition comprising it and a styrene resin tend to have remarkably improved impact resistance, transparency and moldability.

A block copolymer mixture containing a branched block copolymer having one or two types of polymer blocks with different molecular weights each comprising a vinyl aromatic hydrocarbon as monomer units, beyond the range of the present invention, tends to be poor in balance of physical properties such as impact resistance, transparency and moldability, and may be poor in compatibility with a styrene resin in some cases.

Further, it is essential in the present invention that the molecular weight distribution of a mixture of the polymer blocks S1, S2 and S3 of the above formulae each comprising a vinyl aromatic hydrocarbon as monomer units is within a range of from 3.25 to 6. When the molecular weight distribution of the polymer block mixture is within this range, compatibility of the polymer block mixture with a styrene resin such as a polystyrene tends to be favorable, whereby a resin composition obtained by mixing the block copolymer mixture containing a branched block copolymer with a styrene resin tends to have very excellent impact resistance and transparency. If the molecular weight distribution of the mixture of the polymer blocks S1, S2 and S3 is out of the range of from 3.25 to 6, a resin composition obtained by mixing the block copolymer mixture containing a branched block copolymer with a styrene resin will not have sufficient impact resistance and transparency simultaneously.

Among block copolymer mixtures containing a branched block copolymer of the present invention wherein the molecular weight distribution of the mixture of the polymer blocks S1, S2 and S3 is within a range of from 3.25 to 6, a block copolymer mixture containing a branched block copolymer wherein the molecular weight distribution is within a range of from 3.25 to 4.5, is more excellent in balance between transparency such as total luminous transmittance or haze and an area impact property evaluated by a falling weight test or the like, as characteristics of the block copolymer mixture containing a branched block copolymer as it is or a resin composition obtained by mixing such a block copolymer mixture containing a branched block copolymer with a styrene resin. On the other hand, a block copolymer mixture containing a branched block copolymer wherein the molecular weight distribution is within a range of from 4.5 to 6 is slightly poor in transparency such as total luminous transmittance or haze, but is very excellent in notched impact resistance evaluated by a Charpy impact test or the like, as characteristics of the block copolymer mixture containing a branched block copolymer as it is or a resin composition obtained by mixing such a block copolymer mixture containing a branched block copolymer with a styrene resin.

As mentioned above, the present invention is characterized in that materials having various characteristics can be obtained by properly controlling the molecular weight distribution of the mixture of the polymer blocks S1, S2 and S3 within a range of from 3.25 to 6.

The molecular weight distribution which provides a block copolymer mixture containing a branched block copolymer particularly excellent in balance between transparency and area impact property is from 3.25 to 4.5, more preferably from 3.5 to 4.5, furthermore preferably from 3.5 to 4.

On the other hand, the molecular weight distribution which provides a block copolymer mixture containing a branched block copolymer very excellent particularly in notched impact resistance is from 4.5 to 6, more preferably from 4.5 to 5.5, furthermore preferably from 4.5 to 5.

In order to batch off the mixture of the polymer blocks S1, S2 and S3 each comprising a vinyl aromatic hydrocarbon as monomer units, a method wherein the block copolymer mixture containing a branched block copolymer is subjected to ozonolysis and then reduction with lithium aluminum hydride, and the resulting polymer content is obtained, as disclosed in e.g. Polymer, vol. 22, 1721 (1981), Rubber Chemistry and Technology, vol. 59, 16 (1986), Macromolecules, vol. 16, 1925 (1983), etc. or a method of sampling a polymer liquid immediately after completion of polymerization of the polymer blocks S1, S2 and S3 in production of the block copolymer mixture containing a branched block copolymer, may be employed, and the latter method is preferably employed.

As conditions for measuring the polymer block mixture thus batched off by gel permeation chromatography (GPC), a GPC column with a number of theoretical plate of at least 32,000 is used.

More specifically, the following measurement conditions 1 may be mentioned.

[Measurement Conditions 1]
Solvent (mobile phase): THF
Flow rate: 1.0 ml/min
Preset temperature: 40° C.
Column structure: One column of TSK guardcolumn MP (×L) 6.0 mmID×4.0 cm manufactured by TOSOH CORPORATION and two columns of TSK-GEL MULTIPORE HXL-M 7.8 mmID×30.0 cm (number of theoretical plate: 16,000) manufactured by TOSOH CORPORATION, a total of three columns in the order of TSK guardcolumn MP (×L), TSK-GEL MULTIPORE HXL-M and TSK-GEL MULTIPORE HXL-M (number of theoretical plate: 32,000 as a whole)
Sample injection amount: 100 µL (sample liquid concentration 1 mg/ml)
Column pressure: 39 kg/cm$^2$
Detector: RI detector Further, it is essential for the block copolymer mixture containing a branched block copolymer of the present invention that in a gel permeation chromatogram of the polymer blocks S1, S2 and S3 in the above formulae, M1/M3 is within a range of from 13 to 25, and M2/M3 is within a range of from 2 to 4, where M1, M2 and M3 are peak top molecular weights of components corresponding to S1, S2 and S3, respectively.

When M1/M3 is within a range of from 13 to 25 and M2/M3 is within a range of from 2 to 4, the block copolymer mixture containing a branched block copolymer and a mixed resin composition comprising it and a styrene resin tend to have improved impact resistance. A more preferred combination of ranges of M1/M3 and M2/M3 may be a combination of a range of from 14.5 to 24.5 and a range of from 2.1 to 3.6, respectively.

If M1/M3 is out of the range of from 13 to 25 or M2/M3 is out of the range of from 2 to 4, the block copolymer mixture containing a branched block copolymer or a mixed resin composition comprising it and a styrene resin tend to be poor in impact resistance, and be poor in balance in physical properties with transparency, etc.

The peak top molecular weight of the mixture of the polymer blocks S1, S2 and S3 each comprising a vinyl aromatic hydrocarbon as monomer units of the present invention can be determined by GPC. Namely, the peak top molecular weight can be determined by calculation in accordance with a known method (such as "Gel Permeation chromatography", p. 81 to 85 (1976, published by Maruzen Company, Limited, Japan) using a GPC curve prepared by subjecting the mixture of the polymer blocks S1, S2 and S3 each comprising a vinyl aromatic hydrocarbon as monomer units to GPC and a calibration curve prepared from the peak count and the molecular weight obtained by subjecting a monodispersed polystyrene to GPC. Here, S1 has a molecular weight higher than S2, and S2 has a molecular weight higher than S3, whereby peaks of components corresponding to S1, S2 and S3 can be identified in the chromatogram.

To measure the mixture of the polymer blocks S1, S2 and S3 by GPC, it is preferred to use a GPC column with a number of theoretical plate of at least 32,000.

More specifically, the measurement conditions 1 are mentioned as explained for determination of the molecular weight distribution of the polymer block mixture comprising a vinyl aromatic hydrocarbon as monomer units.

The block copolymer mixture containing a branched block copolymer of the present invention preferably contains a branched block copolymer in an amount of from 65 to 90 mass %. The content of the branched block copolymer in the block copolymer mixture can be determined by means of a gel permeation chromatogram as follows.

Namely, in a gel permeation chromatogram of the block copolymer mixture containing a branched block copolymer, the sum of peak areas corresponding to linear block copolymers S1-S, S2-B and S3-B prior to coupling is calculated, and the obtained value is subtracted from the whole peak area, to determine the peak area of the branched block copolymer in the block copolymer mixture in the gel permeation chromatogram.

The proportion of the peak area of the branched block copolymer thus determined, to the whole peak area by percentage is obtained, thereby to determine the content of the branched block copolymer in the block copolymer mixture containing a branched block copolymer by mass %.

The content of the branched block copolymer in the block copolymer mixture is particularly preferably within a range of from 70 to 85 mass %. If the content of the branched block copolymer in the block copolymer mixture is less than 65 mass %, the mixture containing a branched block copolymer and a mixed resin composition comprising it and a styrene resin may be poor in impact resistance, transparency and moldability in some cases, and if it exceeds 90 mass %, the mixture containing a branched block copolymer and a mixed resin composition comprising it and a styrene resin may be poor in impact resistance in some cases.

The gel permeation chromatogram of the block copolymer mixture containing a branched block copolymer is obtained preferably by using a GPC column with a number of theoretical plate of at least 100,000. More specifically, the following measurement conditions 2 are employed.

[Measurement Conditions 2]
Solvent (mobile phase): THF
Flow rate: 0.2 ml/min
Preset temperature: 40° C.
Column structure: One column of KF-G 4.6 mmID×10 cm manufactured by SHOWA DENKO K.K. and four columns of KF-404HQ 4.6 mmID×25.0 cm (number of theoretical plate: 25,000) manufactured by SHOWA DENKO K.K., a total of five columns in the order of KF-G, KF-404HQ, KF-404HQ, KF-404-HQ and KF-404HQ (number of theoretical plate: 100,000 as a whole)
Sample injection amount: 10 μL (sample liquid concentration 2 mg/ml)
Column pressure: 127 kg/cm$^2$
Detector: RI detector Further, the proportion of the number of moles of S1 to the total number of moles of the polymer blocks S1, S2 and S3 each comprising a vinyl aromatic hydrocarbon as monomer units is preferably within a range of from 2 to 30 mol %, whereby the mixture containing a branched block copolymer and a mixed resin composition comprising it and a styrene resin tend to have favorable balanced between impact resistance and transparency. The proportion of the number of moles of S1 to the total number of moles of S1, S2 and S3 is particularly preferably from 5 to 20 mol %, furthermore preferably from 7 to 11 mol %. If the proportion of the number of moles of S1 to the total number of moles of S1, S2 and S3 is less than 2 mol %, the mixture containing a branched block copolymer and a mixed resin composition comprising it and a styrene resin may be poor in transparency in some cases, and if the proportion of the number of moles of S1 to the total number of moles of S1, S2 and S3 exceeds 30 mol %, the mixture containing a branched block copolymer and a mixed resin composition comprising it and a styrene resin may be poor in impact resistance in some cases.

In view of balance of impact resistance, transparency and moldability of the mixture containing a branched block copolymer and a mixed resin composition comprising it and a styrene resin, it is preferred to set proportion of the three types of polymer chains so that the proportion of the number of moles of S1, S2 and S3 is such that S1/S2/S3 is 2 to 30/3 to 70/30 to 95 (molar ratio). It is preferred to set the proportion of the three types of polymer chains so that S1/S2/S3 is preferably 5 to 20/5 to 45/40 to 85 (molar ratio), particularly preferably 7 to 11/20 to 40/45 to 75 (molar ratio). The molar ratio of S1/S2/S3 can be calculated as the molar fraction from the values of M1, M2 and M3 and the values of areas of the respective corresponding peaks on the chromatogram of the mixture of S1, S2 and S3 by GPC.

In the gel permeation chromatogram of the mixture of S1, S2 and S3 of the above formulae, in view of balance of impact resistance, transparency and moldability of the block copolymer mixture containing a branched block copolymer, it is preferred that the peak top molecular weight M1 corresponding to S1 is from 80,000 to 220,000, the peak top molecular weight M2 corresponding to S2 is from 14,000 to 25,000, and the peak top molecular weight M3 corresponding to S3 is from 3,000 to 12,000. Particularly, it is more preferred that M1 is from 100,000 to 170,000, M2 is from 15,000 to 22,000 and M3 is from 5,000 to 10,000.

The number average molecular weights of S1, S2 and S3 are preferably within ranges of from 70,000 to 215,000, from 10,000 to 24,500 and from 1,500 to 11,000, respectively, more preferably from 80,000 to 155,000, from 13,000 to 21,500 and from 3,000 to 9,000, respectively.

Further, in the above formulae, B is a polymer block comprising a conjugated diene as monomer units, and the molecular weight of B is also not particularly limited. However, the number average molecular weight is preferably from 6,000 to 18,000, more preferably from 7,000 to 13,000, in view of balance of impact resistance, transparency and moldability of the block copolymer mixture containing a branched block copolymer.

The molecular weights of B may be the same or different among three types of polymer chains of the above formulae each having a living active site at one terminal, and they are preferably the same.

In the above formulae, Li is a living active site and represents a residue from an organic lithium compound initiator remaining at a terminal of a polymer chain before coupling.

In the mixture containing a branched block copolymer of the present invention, the molecular weight distribution (Mw/Mn) of a peak at which the peak top molecular weight becomes minimum among peaks which satisfy the following (a) and (b) is preferably less than 1.03, whereby the block copolymer mixture containing a branched block copolymer tends to have more improved impact resistance, particularly area impact property:

(a) the peak top molecular weight is within a range of from 20,000 to 50,000,
(b) the proportion of the area is within a range of from 3 to 15% to the whole peak area.

The molecular weight distribution of the peak at which the peak top molecular weight becomes minimum among peaks which satisfy the above (a) and (b) is more preferably from 1.005 to 1.025.

The molecular weight distribution of the peak at which the peak top molecular weight becomes minimum among peaks which satisfy the above (a) and (b) can be obtained by a gel permeation chromatogram prepared by measuring the block copolymer mixture containing a branched block copolymer of the present invention by GPC and a calibration curve prepared by using a commercial standard polystyrene for GPC. For measurement, it is preferred to use a GPC column with a number of theoretical plate of at least 100,000. More specifically, the above measurement conditions 2 may be mentioned.

Further, in the block copolymer mixture containing a branched block copolymer of the present invention, the proportion of the area of the peak at which the peak top molecular weight becomes maximum among peaks at which the peak top molecular weight is within a range of from 200,000 to 380,000, is preferably from 2 to 10% to the whole peak area, whereby a mixed resin composition comprising such a block copolymer mixture containing a branched block copolymer and a styrene resin tends to have more improved impact resistance, particularly area impact property.

The proportion of the area of the above peak to the whole peak area is more preferably from 3 to 9%.

The proportion of the area of the above peak to the whole peak area is obtained preferably by measurement using a GPC column with a number of theoretical plate of at least 100,000 using a gel permeation chromatogram prepared by measuring the block copolymer mixture containing a branched block copolymer of the present invention by GPC and a calibration curve prepared by using a commercial standard polystyrene for GPC. Specifically, the above measurement conditions 2 are employed.

Further, in the block copolymer mixture containing a branched block copolymer formed by coupling of the polymer chains represented by the above formulae, in a gel permeation chromatogram of a mixture of copolymers S1-B, S2-B and S3-B each comprising a polymer block comprising a vinyl aromatic hydrocarbon as monomer units and a polymer block comprising a conjugated diene as monomer units, M4/M6 is preferably within a range of from 4.5 to 9, and M5/M6 is preferably within a range of from 1.3 to 1.8, where M4, M5 and M6 are peak top molecular weights of components corresponding to S1-B, S2-B and S3-B, respectively. When M4/M6 is from 4.5 to 9 and M5/M6 is from 1.3 to 1.8, a mixed resin composition comprising the block copolymer mixture containing a branched block copolymer of the present invention and a styrene resin tends to have more improved impact resistance. M4/M6 and M5/M6 are particularly preferably within ranges of from 4.5 to 8.5 and from 1.33 to 1.77, furthermore preferably from 4.9 to 8.1 and from 1.35 to 1.75, respectively.

The peak top molecular weights of a mixture of the copolymers S1-B, S2-B and S3-B each comprising a polymer block comprising a vinyl aromatic hydrocarbon as monomer units and a polymer block comprising a conjugated diene as monomer units can also be obtained by GPC under the same conditions for the above-described mixture of the polymer blocks S1, S2 and S3 each comprising a vinyl aromatic hydrocarbon as monomer units. Namely, M4, M5 and M6 are values as calculated as PS. Further, as measurement conditions for the mixture of the copolymers S1-B, S2-B and S3-B by GPC, the measurement conditions 2 may be mentioned.

In the block copolymer mixture containing a branched block copolymer of the present invention, the peak top molecular weight of a component providing a maximum peak area in the gel permeation chromatogram is preferably within a range of from 170,000 to 300,000, whereby the block copolymer mixture containing a branched block copolymer and a mixed resin composition comprising it and a styrene resin tend to have more improved impact resistance and transparency, have favorable moldability, and have excellent balance in physical properties. The peak top molecular weight of a component providing a maximum peak in the gel permeation chromatogram is more preferably within a range of from 175,000 to 270,000, more preferably from 180,000 to 255,000.

To obtain the gel permeation chromatogram, the above measurement conditions 2 using a GPC column with a number of theoretical plate of at least 100,000 are employed.

The block copolymer mixture containing a branched block copolymer of the present invention is obtained by a conventional living anionic polymerization method using an organic lithium compound as an initiator in a hydrocarbon solvent. The branched block copolymer is prepared by subjecting a vinyl aromatic hydrocarbon and a conjugated diene as monomers to anionic polymerization using an organic lithium compound as an initiator in a hydrocarbon solvent to form living active terminals, followed by a coupling step of adding a coupling agent so that the living active terminals react with the coupling agent. For example, it is prepared in such a manner that a vinyl aromatic hydrocarbon is subjected to anionic polymerization by using an initiator first, and then successive addition of an initiator and a vinyl aromatic hydrocarbon to the polymerization system is carried out twice to form three types of polymer blocks with different molecular weights each comprising a vinyl aromatic hydrocarbon as monomer units, and then a conjugated diene is added, and finally a coupling step is carried out.

The coupling agent to be used for the block copolymer mixture containing a branched block copolymer of the present invention may, for example, be a chlorosilane compound such as silicon tetrachloride or 1,2-bis(methyldichlorosilyl)ethane, an alkoxysilane compound such as tetramethoxysilane or tetraphenoxysilane, tin tetrachloride, a polyhalogenated hydrocarbon, a carboxylate, a polyvinyl compound, or an epoxidized oil such as epoxidized soybean oil or epoxidized linseed oil. It is preferably an epoxidized oil, more preferably epoxidized soybean oil.

The coupling means to connect usually two or more polymers having a living active site at one terminal by using a coupling agent. Further, the coupling agent is a compound capable of connecting these living active sites, and as a bifunctional coupling agent having two reaction sites per molecule, dimethyldichlorosilane or dimethyldimethoxysilane may, for example, be mentioned.

There are dimethyldichlorosilane, dimethyldimethoxysilane, etc. as a bifunctional coupling agent having two reaction sites per molecule, whereas there are multifunctional coupling agents having three or more reaction sites per molecule. There are methyltrichlorosilane, methyltrimethoxysilane, etc. as a trifunctional coupling agent having three reaction sites per molecule, and there are tetrachlorosilane, tetramethoxysilane, tetraphenoxysilane, etc. as a tetrafunctional coupling agent having four reaction sites per molecule. Further, the epoxidized oil has three carboxyl carbons of ester linkages per molecule and has at least one epoxy group at the long chain alkyl group side and thereby functions as a polyfunctional coupling agent.

For the block copolymer mixture containing a branched block copolymer of the present invention, one type of a polyfunctional coupling agent may be used alone or two or more types of polyfunctional coupling agents may be used in combination. Further, it is possible to use one or more types of bifunctional coupling agents and one or more types of polyfunctional coupling agents in combination. It is preferred to use one type of a polyfunctional coupling agent alone.

The reaction site in the coupling agent which may be attacked by the living active site is not necessarily completely reacted, but part thereof may remain without being reacted. Further, not all polymer chains having a living active site at one terminal are required to be reacted with the reaction site in the coupling agent, but unreacted polymer chain may remain in the finally formed block copolymer. Further, a block copolymer having a number of branches smaller than the number of branches expected when the reaction site in the coupling agent used is completely reacted, may be present in the finally formed block copolymer, and a polymer chain merely having the living active site substituted by the coupling agent and thereby having only the coupling agent bonded to one terminal, may be present in the finally formed block copolymer. It is rather preferred that the finally formed block copolymer contains any two or more of a block copolymer having the number of branches equal to the number of branches expected when the reaction site in the coupling agent used is completely reacted, a block copolymer having a number of branches smaller than the number of branches expected when the reaction site in the coupling agent used is completely reacted, a polymer chain wherein the coupling agent replaces the living active site and is bonded, and a polymer chain remaining without being reacted with the reaction site of the coupling agent, with a view to obtaining favorable moldability. In the present invention, the above mixture is regarded as a block copolymer mixture containing a branched block copolymer.

The addition amount of the coupling agent may be an optional effective amount, and is preferably set so that the reaction site of the coupling agent is present in a stoichiometric amount or more relative to the living active terminals. Specifically, it is preferred to set the addition amount of the coupling agent so that the reaction site is present in from 1 to 2 equivalent amount relative to the number of moles of the living active terminals present in a polymer liquid before the coupling step.

In a case where the block copolymer mixture containing a branched block copolymer of the present invention is a block copolymer mixture containing a branched block copolymer prepared by coupling using an epoxidized oil, the proportion of the number of moles of an open epoxy group residue present in an epoxidized oil residue in the block copolymer mixture containing a branched block copolymer to the total number of moles of epoxy groups and the open epoxy group residue present in the epoxidized oil residue is preferably less than 0.7, whereby the block copolymer mixture containing a branched block copolymer and a mixed resin composition comprising it and a styrene resin tend to have improved impact resistance, and tend to be excellent in balance with other physical properties such as transparency and moldability. The proportion of the number of moles is more preferably from 0.03 to 0.65, furthermore preferably from 0.03 to 0.5. Particularly when this proportion is within a range of from 0.1 to 0.3, among the impact resistance of the block copolymer mixture containing a branched block copolymer, notched impact resistance as represented by Charpy impact strength improves.

The proportion of the number of moles can be obtained by subjecting the block copolymer mixture containing a branched block copolymer of the present invention to proton NMR spectrum measurement using a heavy solvent such as heavy chloroform or heavy tetrahydrofuran or carbon tetrachloride.

As an organic solvent to be used for production of the block copolymer mixture containing a branched block copolymer of the present invention, a known organic solvent such as an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as benzene, toluene, ethylbenzene or xylene may be used.

Further, an organic lithium compound is a compound having at least one lithium atom bonded to its molecule, and for example, ethyllithium, n-propyllithium, isopropyllithium, n-butyllithium, sec-butyllithium or t-butyllithium may be used.

In production of the block copolymer mixture containing a branched block copolymer of the present invention, a small amount of a polar compound may be dissolved in a solvent. The polar compound is used to improve efficiency of an initiator, to adjust the microstructure of a conjugated diene, or as a randomizing agent in a case where a vinyl aromatic hydrocarbon and a conjugated diene are copolymerized. The polar compound to be used for production of the block copolymer mixture containing a branched block copolymer of the present invention may, for example, be an ether such as tetrahydrofuran, diethylene glycol dimethyl ether or diethylene glycol dibutyl ether, an amine such as triethylamine or tetramethylethylenediamine, a thioether, a phosphine, a phosphoramide, an alkylbenzene sulfonate, or an alkoxide of potassium or sodium. A preferred polar compound is tetrahydrofuran.

The polymerization temperature in production of the block copolymer mixture containing a branched block copolymer of the present invention is usually from −10° C. to 150° C., preferably from 40° C. to 120° C. The time required for polymerization varies depending upon the conditions, but is usually within 48 hours, particularly preferably from 0.5 to 10 hours. Further, the atmosphere in the polymerization system is preferably replaced with an inert gas such as a nitrogen gas. The polymerization pressure is not particularly limited so long as the polymerization is carried out under a pressure sufficient to maintain monomers and a solvent in a liquid phase within the above polymerization temperature range. Further, it is necessary to pay attention not to incorporate impurities which inactivate an initiator and a living polymer, such as water, oxygen or carbon dioxide gas into the polymerization system.

After completion of the polymerization and reaction, a substance having active hydrogen such as water, an alcohol, carbon dioxide, an organic acid or an inorganic acid as a polymerization terminator is added in an amount sufficient to inactivate active terminals to inactivate an active block copolymer which has not participated in the coupling reaction. At this time, when water or an alcohol is used as the polymerization terminator for example, hydrogen is introduced to a polymer chain terminal, and when carbon dioxide is used, a carboxyl group is introduced. Accordingly, by appropriately selecting the polymerization terminator, a block copolymer mixture containing a branched block copolymer containing block copolymer components having various functional groups on their terminals can be produced.

The molecular weight of the block copolymer mixture containing a branched block copolymer formed by coupling at least three polymer chains each having a living active site at one terminal represented by the above formulae is also not particularly limited. However, as a preferred molecular weight in view of moldability of the block copolymer mixture containing a branched block copolymer, the number average molecular weight is from 60,000 to 140,000, and the weight average molecular weight is from 110,000 to 200,000. More preferably, the number average molecular weight is from 60,000 to 96,500, and the weight average molecular weight is from 110,000 to 170,000. Further, the molecular weight distribution of the block copolymer mixture containing a branched block copolymer is also not particularly limited, but the molecular weight distribution is preferably from 1.4 to 2.0, more preferably from 1.5 to 1.9, in view of moldability of the block copolymer mixture containing a branched block copolymer.

The weight average molecular weight and the number average molecular weight mentioned here are values as calculated as polystyrene measured by using a GPC column with a number of theoretical plate of at least 100,000, and the measurement conditions by GPC may be the above measurement conditions 2.

Now, a process for producing the block copolymer mixture containing a branched block copolymer will be explained below.

First, as a first stage polymerization, a block comprising a vinyl aromatic hydrocarbon as monomer units is polymerized, and for this polymerization, a charge amount is determined so as to obtain an aimed molecular weight and then a vinyl aromatic hydrocarbon, an organic lithium compound initiator, a solvent and a polar compound as the case requires, are dissolved, and polymerization is carried out at a predetermined temperature. The amount of the solvent charged, as a ratio of the charge amount of the solvent to the total monomer amount is such that the solvent/total monomer amount is preferably from 20/1 to 2/1 (weight ratio), more preferably from 10/1 to 2.5/1 (weight ratio). If the ratio of the solvent/total monomer amount is at least 20/1, the productivity tends to be poor, and if the solvent/total monomer amount is at most 2/1, the viscosity of the polymer liquid tends to increase, which may influence over the reaction. The ratio of the charge amount of the solvent to the polar compound is preferably such that the polar compound/solvent is from 1/100,000 to 1/1,000 (weight ratio), more preferably from 1/10,000 to 1/3,333 (weight ratio). If the ratio of the polar compound/solvent is less than 1/100,000, the efficiency of the initiator tends to be poor, and if the ratio of the polar compound/solvent exceeds 1/1,000, the microstructure of the conjugated diene may be impaired, thus deteriorating the impact strength. The ratio of the total monomer amount to the charge amount of the first stage organic lithium compound initiator is such that the total monomer amount/first stage organic lithium compound initiator is preferably from 4,000/1 to 5,500/1 (weight ratio), more preferably from 4,300/1 to 5,300/1 (weight ratio), and the ratio of the total monomer amount to the charge amount of the first stage vinyl aromatic hydrocarbon is such that the total monomer amount/first stage vinyl aromatic hydrocarbon is preferably from 2/1 to 4/1 (weight ratio), more preferably from 2.5/1 to 3.5/1 (weight ratio). Further, the ratio of the total organic lithium compound initiator to the charge amount of the first stage organic lithium compound initiator is such that the total organic lithium compound initiator/first stage organic lithium compound initiator is preferably from 5 to 20 (molar ratio), more preferably from 7 to 17 (molar ratio). Complete completion of the first stage polymerization reaction is taken as the end point of the polymerization.

It is preferred that after the completion of the first stage polymerization reaction, predetermined amounts of an organic lithium compound initiator and a vinyl aromatic hydrocarbon are newly added to the polymerization system to initiate a second stage polymerization. The end point of the polymerization can be judged by measuring the solid content concentration in a sampled polymer liquid to confirm whether or not a polymer at a predetermined concentration is formed. Otherwise, it may be judged by confirming that substantially no unreacted monomer remains by e.g. gas chromatography.

With respect to the amounts of the organic lithium compound initiator and the vinyl aromatic hydrocarbon added, their charge amounts are determined so as to obtain aimed molecular weights with respect to a polymer chain prepared continuously from the living polymer active terminals formed in the first stage polymerization and a polymer chain prepared from the organic lithium compound initiator newly added at the completion of the first stage polymerization.

The ratio of the total monomer amount to the charge amount of the second stage organic lithium compound initiator is such that the total monomer amount/second stage organic lithium compound initiator is from 1,300/1 to 2,100/1 (weight ratio), more preferably from 1,400/1 to 1,900/1 (weight ratio), and the ratio of the total organic lithium compound initiator amount to the charge amount of the second stage organic lithium compound initiator is such that the total organic lithium compound initiator/second stage organic lithium compound initiator is preferably from 2/1 to 7/1 (molar ratio), more preferably from 2.5/1 to 6/1 (molar ratio).

Further, the ratio of the total monomer amount to the charge amount of the second stage vinyl aromatic hydrocarbon is such that the total monomer amount/second stage vinyl aromatic hydrocarbon is preferably from 6/1 to 12/1 (weight ratio), more preferably from 7/1 to 10/1 (weight ratio).

After the vinyl aromatic hydrocarbon is added and polymerization is continued at a predetermined temperature, complete completion of the polymerization reaction is taken as the end point of the second stage polymerization.

It is preferred that after completion of the second stage polymerization reaction, predetermined amounts of an organic lithium compound initiator and a vinyl aromatic hydrocarbon are newly added to the polymerization system to initiate a third stage polymerization. Completion of the polymerization can be judged by measuring the solid content concentration in a sampled polymer liquid to confirm whether or not a polymer at a predetermined concentration is formed. Otherwise, it may be judged by confirming that substantially no unreacted monomer remains by e.g. gas chromatography.

With respect to the amounts of the organic lithium compound initiator and the vinyl aromatic hydrocarbon added, their charge amounts are determined to obtain aimed molecular weights with respect to a polymer chain continuously prepared from the living polymer active terminals prepared through the first and second stage polymerization and a polymer chain prepared from the organic lithium compound initiator newly added at the completion of the second stage polymerization.

The ratio of the total monomer amount to the charge amount of a third stage organic lithium compound initiator is such that the total monomer amount/third stage organic lithium compound initiator is preferably from 600/1 to 1,000/1 (weight ratio), more preferably from 700/1 to 900/1 (weight ratio), and the ratio of the total organic lithium compound initiator amount to the charge amount of the third stage organic lithium compound initiator is such that the total organic lithium compound initiator/third stage organic lithium compound initiator is preferably from 1.05/1 to 4/1 (molar ratio), more preferably from 1.15/1 to 3/1 (molar ratio). Further, the ratio of the total monomer amount to the charge amount of the third stage vinyl aromatic hydrocarbon is such that the total monomer amount/third stage vinyl aromatic hydrocarbon is preferably from 1.5/1 to 6/1 (weight ratio), more preferably from 2.5/1 to 5/1 (weight ratio).

After the vinyl aromatic hydrocarbon is added and polymerization is continued at a predetermined temperature, complete completion of the polymerization reaction is taken as the end point of the third stage polymerization. It is preferred that after completion of the third stage polymerization, a predetermined amount of a conjugated diene is newly added to the polymerization system to initiate a fourth stage polymerization. Completion of the polymerization can be judged by measuring the solid content concentration in a sampled polymer liquid to confirm whether or not a polymer at a predetermined concentration is formed. Otherwise, it may be judged by confirming that substantially no unreacted monomer remains by e.g. gas chromatography.

At the end point of the third stage polymerization, three types of polymer chains S1, S2 and S3 represented by the above formulae are obtained, and a mixture of three types of polymer chains S1, S2 and S3 can be batched off by sampling the polymer liquid.

At the fourth stage polymerization, a charge amount is determined to obtain an aimed molecular weight and then a conjugated diene is added. The ratio of the charge amount of the conjugated diene to the total monomer amount is such that the conjugated diene/total monomer amount is preferably from 2.5/1 to 6.7/1 (weight ratio), more preferably from 2.9/1 to 4/1 (weight ratio). After the conjugated diene is added and the polymerization is continued at a predetermined temperature, complete completion of the polymerization reaction is taken as the end point of the fourth stage polymerization.

It is preferred that after the completion of the fourth stage polymerization, a predetermined amount of a coupling agent is added to initiate a coupling step. The end point of the polymerization can be judged by measuring the solid content concentration in a sampled polymer liquid to confirm whether or not a polymer at a predetermined concentration is formed.

At the end point of the fourth stage polymerization, three types of polymer chains S1-B, S2-B and S3-B represented by the above formulae are obtained, and a mixture of the three types of polymer chains S1-B, S2-B and S3-B can be batched off by sampling the polymer liquid.

In the coupling step, to the polymer liquid containing three types of the polymer chains S1-B, S2-B and S3-B represented by the above formulae, one or more types of multifunctional coupling agents, preferably an epoxidized oil, more preferably an epoxidized soybean oil is added to continue a coupling reaction at a predetermined temperature. The ratio of the charge amount of the coupling agent to the total monomer amount is such that the coupling agent/total monomer amount is preferably from 100/1 to 500/1 (weight ratio), more preferably from 150/0 to 450/1 (weight ratio).

The end point of the coupling step is not particularly limited, but a point where the coupling reaction does not proceed any more determined by measuring a sampled polymer liquid by GPC is preferably taken as the end point. Further, it is preferred to inactivate active terminals of a remaining active polymer chain which has not participated in the coupling reaction with a polymerization terminator such as water or an alcohol.

The block copolymer thus obtained is a mixture of block copolymers represented by the following formula (1), or the like:

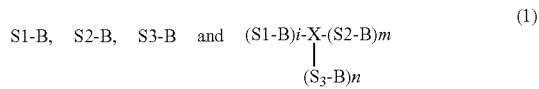

(1)

(wherein each of S1, S2 and S3 is a polymer block comprising a vinyl aromatic hydrocarbon as monomer units, B is a polymer block comprising a conjugated diene as monomer units, x is a residue of the coupling agent, and each of i, m and n is an integer of at least 0, and their upper limits are not particularly limited but are preferably at most 7, more preferably from 0 to 4, and further, i+m+n is at least 1; and each of S1-B, S2-B and S3-B is a residual polymer chain which have not participated in the coupling reaction, the active terminal of which is inactivated with a polymerization terminator such as water or an alcohol, and one terminal of the B block has no X bonded thereto).

With the block copolymer mixture containing a branched block copolymer of the present invention, various additives may further be blended as a case requires.

In a case where the block copolymer mixture is subjected to a heat treatment, or to prevent deterioration of physical properties when a molded product of the mixture is used in an oxidizing atmosphere or under irradiation with e.g. ultraviolet rays, or to further improve physical properties suitable for the purpose of use, an additive such as a stabilizer, a lubricant, a processing aid, an antiblocking agent, an antistatic agent, an antifogging agent, a weather resistance-improving agent, a softening agent, a plasticizer or a pigment may, for example, be added.

The stabilizer may, for example, be 2-[1-(2-hydroxy-3,5-di-tert-pentylphenyl)ethyl]-4,6-di-tert-pentylphenyl acrylate, 2-tert-butyl-6-(3-tert-butyl-2-hydroxy-5-methylbenzyl)-4-methylphenyl acrylate, or a phenol antioxidant such as octadecyl-3-(3,5-di-tert-butyl-4-hydroxyphenyl)propionate or 2,6-di-tert-butyl-4-methylphenol, or a phosphorus antioxidant such as 2,2-methylenebis(4,6-di-tert-butylphenyl)octyl phosphite, trisnonylphenyl phosphite or bis(2,6-di-tert-butyl-4-methylphenyl)pentaerythritol-di-phosphite.

Further, the lubricant, processing acid, antiblocking agent, antistatic agent or antifogging agent may, for example, be a saturated fatty acid such as palmitic acid, stearic acid or behenic acid, a fatty acid ester or a pentaerythritol fatty acid ester such as octyl palmitate or octyl stearate, a fatty acid amide such as erucamide, oleamide or stearamide, or an ethylenebisstearamide, a glycerol-mono-fatty acid ester, a glycerol-di-fatty acid ester, a sorbitan fatty acid ester such as sorbitan-mono-palmitate or sorbitan-mono-stearate, or a higher alcohol such as myristyl alcohol, cetyl alcohol or stearyl alcohol.

Further, the weather resistance-improving agent may, for example, be a benzotriazole type such as 2-(2'-hydroxy-3'-tert-butyl-5'-methylphenyl)-5-chlorobenzotriazole, a salicylate type such as 2,4-di-tert-butylphenyl-3',5'-di-tert-butyl-4'-hydroxybenzoate, a benzophenone type ultraviolet absorber such as 2-hydroxy-4-n-octoxybenzophenone, or a hindered amine type weather resistance-improving agent such as tetrakis(2,2,6,6-tetramethyl-4-piperidyl)-1,2,3,4-butanetetracarboxylate. Further, white oil or silicone oil may, for example, be added.

Such an additive is used preferably in an amount of from 0 to 5 mass %, in the block copolymer mixture containing a branched block copolymer of the present invention.

The block copolymer mixture containing a branched block copolymer thus obtained can be easily molded and processed into various practically useful products such as sheets, foams, films, and injection molded products, blow molded products, pressure molded products, vacuum molded products and biaxially oriented products having various shapes, etc., by an optional conventional molding or processing method such as extrusion, injection molding or blow molding.

The block copolymer mixture containing a branched block copolymer of the present invention may be blended with a thermoplastic resin as the case requires to form a resin composition. As examples of the thermoplastic resin to be used, a polystyrene polymer, a polyphenylene ether polymer, a polyethylene polymer, a polypropylene polymer, a polybutene polymer, a polyvinyl chloride polymer, a polyvinyl acetate polymer, a polyamide polymer, a thermoplastic polyester polymer, a polyacrylate polymer, a polyphenoxy polymer, a polyphenylene sulfide polymer, a polycarbonate polymer, a polyacetal polymer, a polybutadiene polymer, a thermoplastic polyurethane polymer and a polysulfin polymer may, for example, be mentioned. A preferred thermoplastic resin is a styrene polymer, and a polystyrene resin, a styrene-butyl acrylate copolymer or a styrene-methyl methacrylate copolymer is particularly preferably used.

The blend mass ratio of the block copolymer mixture containing a branched block copolymer of the present invention to the thermoplastic resin is preferably such that the block copolymer mixture containing a branched block copolymer/thermoplastic resin is from 3/97 to 90/10. If the blend amount of the block copolymer is less than 3 mass %, no sufficient effect of improving impact resistance of a formed resin composition will be obtained, and if the blend amount of the thermoplastic resin is less than 10 mass %, no sufficient effect of improving rigidity, etc. by blending the thermoplastic resin will be obtained. As a particularly preferred blend mass ratio of the block copolymer mixture containing a branched block copolymer to the thermoplastic resin, the block copolymer mixture containing a branched block copolymer/thermoplastic resin is from 30/70 to 80/20, more preferably from 40/60 to 70/30.

Now, the present invention will be explained in further detail with reference to Examples. However, the present invention is by no means restricted to such specific Examples.

Data shown in Examples and Comparative Examples were measured in accordance with the following methods.

The total luminous transmittance and the haze were measured in accordance with JIS-K7105 and the Charpy impact strength was measured in accordance with JIS K-7111 (notched) by molding a test specimen from resin pellets by a injection molding machine.

Similarly, the falling weight impact strength was measured in such a manner that a flat plate with a thickness of 2 mm was formed by an injection molding machine, and by using a Falling Weight type Graphic Impact Tester (trade mark for instrumented falling weight impact tester manufactured by Toyo Seiki Seisaku-Sho, Ltd.), a heavy weight with a mass of 6.5 kg was made to freely fall from a height of 62 cm on the plane of the test specimen fixed in a holder (diameter: 40 mm), and the test specimen was completely destroyed or pierced by means of a striker (diameter: 12.7 mm) provided at the bottom of the heavy weight, and the total energy (hereinafter referred to as total absorbed energy) required at this time was measured.

Further, the amount of a polybutadiene rubber component (PBd amount) in the branched block copolymer mixture was determined by a halogen addition method of adding iodine chloride to a double bond.

Further, fluidity (MFR) at a high temperature was measured in accordance with JIS K-7210.

The number average molecular weight of the polymer block B comprising a conjugated diene as monomer units is determined in such a manner that where in a chromatogram of a mixture of S1, S2 and S3 by GPC under the measurement conditions 1, values of the number average molecular weights of the respective corresponding peaks are represented by M7, M8 and M9, and in a chromatogram of a mixture of S1-B, S2-B and S3-B by GPC under the measurement conditions 2, values of the number average molecular weights of the respective corresponding peaks are represented by M10, M11 and M12, a value of the number average molecular weight of B as calculated as polystyrene was obtained from the following formula:

$$X=\{(M10-M7)+(M11-M8)+(M12-M9)\}/3$$

and a standard polybutadiene the molecular weight of which was known was measured by GPC to obtain its molecular weight as calculated as polystyrene, whereby a transformation formula $Y=0.58 \times X$ from X to the absolute molecular weight value Y was calculated, to determine the number average molecular weight of B.

Further, the proportion of the number of moles of an open epoxy group residue present in an epoxidized oil residue in the block copolymer mixture containing a branched block copolymer, to the total number of moles of epoxy groups and the open epoxy group residue present in the epoxidized oil residue, is determined by proton NMR is spectrum measurement as follows.

First, 40 mg of a sample was dissolved in 1 ml of heavy chloroform, and a proton NMR spectrum was measured by using JNM-α500 FT-NMR manufactured by JEOL Ltd. under the following conditions.

Pulse width: 5.90 μs (45°), data point: 16,384, repetition time: 7.0480 seconds, AD converter: 32 Kbit, integrated number: 792, sample tube: 5 mm in diameter, measurement temperature: room temperature.

Figure 2:
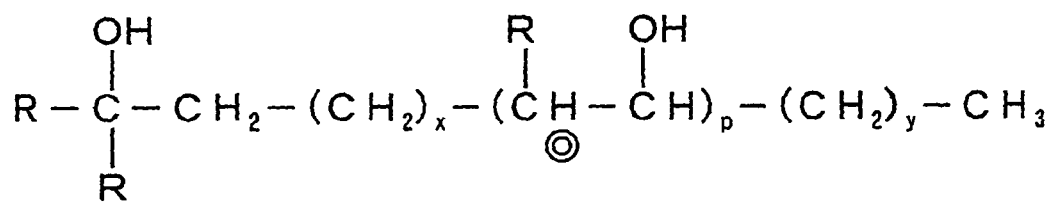
FIG. 2 illustrates a methine proton (proton with a mark ◎) derived from an opn epoxy group residue present in an epoxidized oil residue.

In the obtained proton NMR spectrum, peaks of methine protons (protons with marks ● in FIG. 1) derived from an epoxy group present in an epoxidized oil residue appear at from 2.8 to 3.2 ppm. Further, a peak of a methine proton (a proton with a mark ⊚ in FIG. 2) derived from an open epoxy group residue present in an epoxidized oil residue appears at 3.75 ppm.

Employing a peak (the area of which is M) of a chemical shift at from 2.8 to 3.2 ppm and a peak (the area of which is N) of a chemical shift at 3.75 ppm, the proportion R of the number of moles of an open epoxy group residue present in an epoxidized oil residue in the block copolymer mixture containing a branched block copolymer to the total number of moles of epoxy groups and the open epoxy group residue present in the epoxidized oil residue, was calculated from the following formula:

$$R=(2 \times N)/(M+2 \times N)$$

Example 1

A block copolymer mixture containing a branched block copolymer is obtained by a conventional living anionic polymerization method using an organic lithium compound as an initiator in a hydrocarbon solvent.

Specifically, a jacketed stainless steel polymerization tank equipped with a stirrer, having an internal volume of 10 L, was washed with cyclohexane, and the air in the polymerization tank was replaced with nitrogen, and then 3,836 g of cyclohexane dehydrated to a moisture content of at most 7 ppm, containing 150 ppm of tetrahydrofuran was charged into the polymerization tank, and then 568 g of styrene dehydrated to a moisture content of at most 7 ppm was added. After the internal temperature was increased to 50° C., 5.8 ml of a n-butyllithium 10 mass % cyclohexane solution was added, and polymerization was carried out for 20 minutes so that the maximum temperature would not exceed 120° C. (first stage polymerization).

Then, at a constant internal temperature of 50° C., 14 ml of a n-butyllithium 10 mass % cyclohexane solution and then 188 g of styrene dehydrated to a moisture content of at most 7 ppm were added, and polymerization was carried out for 20 minutes so that the maximum temperature would not exceed 120° C. (second stage polymerization).

Then, at a constant internal temperature of 50° C., 29.3 ml of a n-butyllithium 10 mass % cyclohexane solution and then 428 g of styrene dehydrated to a moisture content of at most 7 ppm were added, and polymerization was carried out for 15 minutes so that the maximum temperature would not exceed 120° C. (third stage polymerization).

After completion of the third stage polymerization, sampling was carried out, the sampled polymer liquid was diluted with toluene, and the obtained solution was pored into a large amount of methanol to precipitate a polymer content, which was vacuum dried and the resulting product was measured by GPC under the measurement conditions 1. As a result, three types of polymer chains S1, S2 and S3 were present in the sampled product, and where their peak top molecular weights are represented by M1, M2 and M3, respectively, they were 143,000, 20,000 and 8,900, respectively, and M1/M3 was 16.07 and M2/M3 was 2.25. Further, the molecular weight distribution Mw/Mn of a mixture of S1, S2 and S3 was 3.76, and the proportion of the number of moles of S1 to the total number of moles of S1, S2 and S3 was 9.8 mol %.

Further, after the internal temperature was increased to 80° C., 460 g of butadiene dehydrated by being passed through molecular sieves was added, and polymerization was carried out for 20 minutes so that the maximum temperature would not exceed 120° C. (fourth stage polymerization).

After completion of the fourth stage polymerization, sampling was carried out, the sampled polymer liquid was diluted with toluene, and the obtained solution was poured into a large amount of methanol to precipitate a polymer content, which was vacuum-dried, and the obtained product was measured by GPC under the measurement conditions 2. As a result, three types of polymer chains S1-B, S2-B and S3-B were present in the sampled product, and where their peak top molecular weights were represented by M4, M5 and M6, they were 167,000, 41,000 and 29,000, respectively, and M4/M5 was 5.76 and M5/M6 was 1.41.

After completion of the successive polymerization, at a constant internal temperature of 80° C., a solution having 5.9 g of a coupling agent Vikoflex 7170 (manufactured by ATO-FINA CHEMICALS) comprising an epoxidized soybean oil dissolved in 10 ml of cyclohexane was added, and coupling reaction was carried out for 30 minutes (coupling step).

Finally, all polymer active terminals were inactivated with methanol. The polymer liquid was diluted with cyclohexane, and the obtained solution was poured into a large amount of methanol to precipitate a polymer content, which was vacuum dried to obtain a powdery polymer.

The polymer was measured by GPC under the measurement conditions 2, whereupon the peak top molecular weight of a component providing a maximum peak of the polymer was 200,000, and the molecular weight distribution of a peak at which the peak top molecular weight becomes minimum among peaks (a) at which the peak top molecular weight is within a range of from 20,000 to 50,000 and (b) which form a proportion of the area of from 3 to 15% to the whole peak area, was 1.008. Further, in a gel permeation chromatogram of the block copolymer mixture containing a branched block copolymer, the proportion of the area of a peak at which the peak top molecular weight becomes maximum among peaks at which the peak top molecular weight is within a range of from 200,000 to 380,000, was 5.2% to the whole peak area.

Further, the proportion of the number of moles of an open epoxy group residue present in an epoxidized oil residue in the block copolymer mixture containing a branched block copolymer, to the total number of moles of epoxy groups and the open epoxy group residue present in the epoxidized oil residue was 0.09.

Finally, 0.2 part by mass of 2,4-bis[(octylthio)methyl]-o-cresol as a stabilizer was added to 100 parts by mass of the powdery polymer, and the powdery polymer was supplied to a 20 mm single screw extruder, and a molten strand was withdrawn from a die at 210° C., cooled with water and cut by a cutter to obtain resin pellet. The charge amounts are shown in Table 1, various analyzed values are shown in Tables 2 to 4, and results of evaluation of solid physical properties are shown in Table 5.

Examples 2 to 7 and Comparative Examples 1 to 5

In the same manner as in Example 1, pellets were obtained employing formulae as shown in Table 1 in Examples 2 to 7. Various analyzed values are shown in Tables 2 to 4, and results of evaluation of solid physical properties are shown in Table 5. In Comparative Examples 1 to 5, pellets were obtained employing formulae as shown in Table 6. Various analyzed values are shown in Tables 7 to 9, and results of evaluation of solid physical properties are shown in Table 10 GPC measurement was carried out under the measurement conditions 1 after completion of the third stage polymerization and under measurement conditions 2 after completion of the fourth stage polymerization, and a gel permeation chromatogram of the obtained block copolymer mixture containing a branched block copolymer was obtained under the measurement conditions 2.

Figure 3:
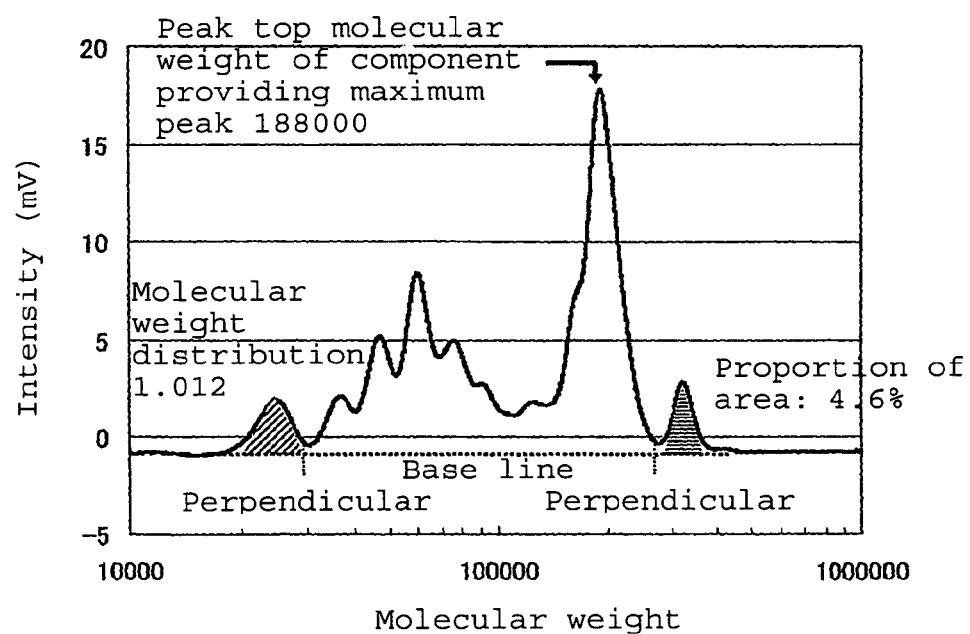
FIG. 3 is a chromatogram obtained by measuring a block copolymer mixture under measurement conditions 2.

A chromatogram obtained by measuring the block copolymer mixture containing a branched block copolymer of Example 3 under the measurement conditions 2 is shown in FIG. 3.

TABLE 1

| | Amount of materials charged | | | | | | |
|---|---|---|---|---|---|---|---|
| | Ex. 1 | Ex. 2 | Ex. 3 | Ex. 4 | Ex. 5 | Ex. 6 | Ex. 7 |
| Solvent cyclohexane (g) | 3836 | 3840 | 4109 | 3818 | 3821 | 4086 | 4086 |
| Solvent/total monomer amount (weight ratio) | 2.3 | 2.3 | 3.0 | 2.3 | 2.3 | 2.8 | 3.0 |
| First stage n-BuLi 10% cyclohexane solution (ml) | 5.8 | 6.1 | 5.3 | 5.3 | 5.3 | 4.8 | 5 |
| First stage styrene (g) | 568 | 568 | 491 | 540 | 541 | 450 | 444 |
| Second stage n-BuLi 10% cyclohexane solution (ml) | 14 | 14 | 11.7 | 12.9 | 12.9 | 10.9 | 11.6 |
| Second stage styrene (g) | 188 | 188 | 162 | 179 | 179 | 149 | 201 |
| Third stage n-BuLi 10% cyclohexane solution (ml) | 29.3 | 29.3 | 24.6 | 27 | 27.1 | 23 | 40 |
| Third stage styrene (g) | 428 | 428 | 370 | 408 | 408 | 424 | 299 |
| Butadiene (g) | 460 | 460 | 347 | 510 | 510 | 424 | 419 |
| Vikoflex 7170 (g) | 5.9 | 4.5 | 6 | 4.2 | 5.7 | 6.3 | 7.7 |

TABLE 2

Analyzed values of polymer content formed by the end of third stage polymerization

|  | Ex. 1 | Ex. 2 | Ex. 3 | Ex. 4 | Ex. 5 | Ex. 6 | Ex. 7 |
|---|---|---|---|---|---|---|---|
| GPC measurement conditions | 1 | 1 | 1 | 1 | 1 | 1 | 1 |
| Peak top molecular weight M1 | 143000 | 138000 | 139000 | 158000 | 129000 | 129000 | 146000 |
| Peak top molecular weight M2 | 20000 | 21000 | 21000 | 20000 | 20000 | 20000 | 21000 |
| Peak top molecular weight M3 | 8900 | 8700 | 9300 | 9300 | 8600 | 8600 | 6000 |
| Molar ratio of component S1 | 9.8 | 10 | 10.3 | 10.4 | 10 | 10.7 | 7.4 |
| Molar ratio of component S2 | 30.9 | 30.4 | 30.7 | 34.5 | 30.2 | 29.2 | 25.5 |
| Molar ratio of component S3 | 59.3 | 59.6 | 59 | 55.1 | 59.8 | 60 | 67.1 |
| M1/M3 | 16.07 | 15.86 | 14.95 | 16.99 | 15.00 | 15.00 | 24.33 |
| M2/M3 | 2.25 | 2.41 | 2.26 | 2.15 | 2.33 | 2.33 | 3.50 |
| Molecular weight distribution (Mw/Mn) | 3.76 | 3.68 | 3.53 | 3.69 | 3.32 | 3.39 | 4.77 |

TABLE 3

Analyzed values of polymer content formed by the end of fourth stage polymerization

|  | Ex. 1 | Ex. 2 | Ex. 3 | Ex. 4 | Ex. 5 | Ex. 6 | Ex. 7 |
|---|---|---|---|---|---|---|---|
| GPC measurement conditions | 2 | 2 | 2 | 2 | 2 | 2 | 2 |
| Peak top molecular weight M4 | 167000 | 156000 | 169000 | 169000 | 169000 | 154000 | 162000 |
| Peak top molecular weight M5 | 41000 | 34700 | 40000 | 45000 | 46000 | 42000 | 35000 |
| Peak top molecular weight M6 | 29000 | 24000 | 26000 | 32000 | 34000 | 30000 | 20000 |
| M4/M6 | 5.76 | 6.50 | 6.50 | 5.28 | 4.97 | 5.13 | 8.10 |
| M5/M6 | 1.41 | 1.45 | 1.54 | 1.41 | 1.35 | 1.40 | 1.75 |
| Number average molecular weight of polymer block comprising conjugated diene as monomer units | 11000 | 9300 | 8800 | 12000 | 12000 | 12000 | 8500 |

TABLE 4

Analyzed values of block copolymer mixture containing a branched block copolymer

|  | Ex. 1 | Ex. 2 | Ex. 3 | Ex. 4 | Ex. 5 | Ex. 6 | Ex. 7 |
|---|---|---|---|---|---|---|---|
| GPC measurement conditions | 2 | 2 | 2 | 2 | 2 | 2 | 2 |
| Content (%) of branched block copolymer | 79 | 75 | 80 | 75 | 82 | 80 | 71 |
| Weight average molecular weight by GPC | 137600 | 147900 | 128200 | 166800 | 143600 | 129400 | 118100 |
| Number average molecular weight by GPC | 82100 | 85900 | 78100 | 96100 | 92400 | 84400 | 65700 |
| Molecular weight distribution by GPC | 1.68 | 1.72 | 1.64 | 1.74 | 1.55 | 1.53 | 1.80 |
| Peak top molecular weight of maximum peak by GPC | 200000 | 215000 | 188000 | 247000 | 195000 | 186000 | 187000 |
| Molecular weight distribution (Mw/Mn) of peak at which peak top molecular weight becomes minimum among peaks (a) at which the peak top molecular weight is from 20,000 to 50,000 and (b) which form a proportion of the area of from 3 to 15% | 1.008 | 1.011 | 1.012 | 1.008 | 1.008 | 1.007 | 1.020 |
| Proportion (%) of the area of peak at which the peak top molecular weight becomes maximum among peaks at which the peak top molecular weight is from 200,000 to 380,000 | 5.2 | 7.1 | 4.6 | 8.8 | 6.8 | 4.6 | 3.5 |
| Proportion of number of moles of open epoxy group residue present in epoxidized oil residue to the total number of moles of epoxy groups and open epoxy group residue by NMR | 0.09 | 0.4 | 0.05 | 0.61 | 0.13 | 0.05 | 0.03 |

TABLE 5

Results of evaluation of physical properties of block copolymer mixture containing a branched block copolymer

|  | Ex. 1 | Ex. 2 | Ex. 3 | Ex. 4 | Ex. 5 | Ex. 6 | Ex. 7 |
|---|---|---|---|---|---|---|---|
| PBd amount (%) | 28 | 28 | 25 | 31 | 31 | 31 | 31 |
| MFR (g/10 min) | 15.5 | 15.9 | 21.7 | 8 | 10.8 | 13.8 | 29 |
| Haze (%) | 2 | 1.8 | 1.7 | 1.9 | 1.8 | 1.6 | 3.2 |
| Total luminous transmittance (%) | 89 | 90 | 89 | 89 | 89 | 89 | 87 |
| Total absorbed energy (J) | 13.4 | 14.5 | 15.2 | 12.5 | 12.9 | 13.3 | 13.4 |
| Charpy impact strength (kJ/m) | 2.4 | 2.1 | 2.2 | 3.3 | 11.7 | 6 | 30.3 |

TABLE 6

Amount of materials charged

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Solvent cyclohexane (g) | 4310 | 4316 | 4113 | 4086 | 4085 | 4329 |
| Solvent/total monomer amount (weight ratio) | 3.8 | 3.8 | 3.0 | 3.0 | 3.0 | 4.9 |
| First stage n-BuLi 10% cyclohexane solution (ml) | 5 | 5 | 6 | 4.8 | 6 | 14.6 |
| First stage styrene (g) | 394 | 346 | 478 | 450 | 570 | 614 |
| Second stage n-BuLi 10% cyclohexane solution (ml) | 10.6 | 10.4 | 13.9 | 10.9 | 6 | 15.2 |
| Second stage styrene (g) | 79 | 308 | 122 | 149 | 111 | 272 |
| Third stage n-BuLi 10% cyclohexane solution (ml) | 15.4 | 15 | 24.8 | 23 | 16.7 |  |
| Third stage styrene (g) | 355 | 174 | 425 | 339 | 253 |  |
| Butadiene (g) | 319 | 319 | 347 | 424 | 427 | 265 |
| Vikoflex 7170 (g) | 2.7 | 2.6 | 3.9 | 3.1 | 3.5 | 2.9 |

TABLE 7

Analyzed values of polymer content formed by the end of third stage polymerization

|  | Comp. Ex. 1 | Comp. Ex. 2 | Comp. Ex. 3 | Comp. Ex. 4 | Comp. Ex. 5 |
|---|---|---|---|---|---|
| GPC measurement conditions | 1 | 1 | 1 | 1 | 1 |
| Peak top molecular weight M1 | 124000 | 148000 | 109000 | 148000 | 123000 |
| Peak top molecular weight M2 | 19000 | 29000 | 16000 | 23000 | 19000 |
| Peak top molecular weight M3 | 11300 | 5800 | 8500 | 11000 | 8100 |
| Molar ratio of component S1 | 12.4 | 9.2 | 11 | 9.2 | 18.5 |
| Molar ratio of component S2 | 35.1 | 39.3 | 32.5 | 29.6 | 21.7 |
| Molar ratio of component S3 | 52.5 | 51.5 | 56.4 | 61.2 | 59.8 |
| M1/M3 | 10.97 | 25.52 | 12.82 | 13.45 | 15.19 |
| M2/M3 | 1.68 | 5.00 | 1.88 | 2.09 | 2.35 |
| Molecular weight distribution (Mw/Mn) | 2.86 | 3.08 | 3.00 | 3.20 | 3.09 |

TABLE 8

Analyzed values of polymer content formed by the end of fourth stage polymerization

|  | Comp. Ex. 1 | Comp. Ex. 2 | Comp. Ex. 3 | Comp. Ex. 4 | Comp. Ex. 5 |
|---|---|---|---|---|---|
| GPC measurement conditions | 2 | 2 | 2 | 2 | 2 |
| Peak top molecular weight M4 | 146000 | 171000 | 122000 | 169000 | 148000 |
| Peak top molecular weight M5 | 36000 | 49000 | 31000 | 43000 | 46000 |
| Peak top molecular weight M6 | 29000 | 26000 | 24000 | 32000 | 36000 |
| M4/M6 | 5.03 | 6.58 | 5.08 | 5.28 | 4.11 |
| M5/M6 | 1.24 | 1.88 | 1.29 | 1.34 | 1.28 |
| Number average molecular weight of polymer block comprising conjugated diene as monomer units | 11000 | 12000 | 8900 | 12000 | 16000 |

TABLE 9

Analyzed values of block copolymer mixture containing a branched block copolymer

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| GPC measurement conditions | 2 | 2 | 2 | 2 | 2 | 2 |
| Content (%) of branched block copolymer | 80 | 82 | 85 | 79 | 75 | 82 |
| Weight average molecular weight by GPC | 148700 | 172600 | 128100 | 159700 | 179400 | 122000 |
| Number average molecular weight by GPC | 95800 | 104800 | 79200 | 96800 | 124800 | 83000 |
| Molecular weight distribution by GPC | 1.55 | 1.65 | 1.62 | 1.65 | 1.44 | 1.47 |
| Peak top molecular weight of maximum peak by GPC | 214000 | 246000 | 182000 | 245000 | 195000 | 151000 |
| Molecular weight distribution (Mw/Mn) of peak at which peak top molecular weight becomes minimum among peaks (a) at which the peak top molecular weight is from 20,000 to 50,000 and (b) which form a proportion of the area of from 3 to 15% | 1.005 | 1.014 | 1.080 | 1.007 | 1.008 | 1.007 |
| Proportion (%) of the area of peak at which the peak top molecular weight becomes maximum among peaks at which the peak top molecular weight is from 200,000 to 380,000 | 7 | 6.4 | 0.7 | 5.7 | 12.8 | 3.7 |
| Proportion of number of moles of open epoxy group residue present in epoxidized oil residue to the total number of moles of epoxy groups and open epoxy group residue by NMR | 0.74 | 0.68 | 0.73 | 0.78 | 0.14 | 0.34 |

TABLE 10

Results of evaluation of physical properties of block copolymer mixture containing a branched block copolymer

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| PBd amount (%) | 28 | 28 | 25 | 31 | 31 | 23 |
| MFR (g/10 min) | 7.8 | 5.1 | 25.5 | 7.5 | 2.3 | 12.8 |
| Haze (%) | 1.4 | 1.3 | 1.4 | 1.6 | 2.5 | 2.9 |
| Total luminous transmittance (%) | 90 | 90 | 90 | 90 | 89 | 90 |
| Total absorbed energy (J) | 1.1 | 6 | 1 | 8 | 9 | 1 |
| Charpy impact strength (kJ/m) | 1.1 | 1.3 | 0.9 | 1.7 | 4.5 | 1.1 |

In FIG. 3, to determine the proportion of the area of each peak to the whole peak area in the chromatogram, an area of a portion surrounded by the base line and perpendiculars drawn from valleys between peaks to the base line was calculated with respect to each peak to obtain the proportion of the area of each peak to the whole area of the chromatogram of the block copolymer mixture containing a branched block copolymer as a percentage. Further, the molecular weight distribution of the peak at which the peak top molecular weight becomes minimum among peaks (a) at which the peak top molecular weight is within a range of from 20,000 to 50,000 and (b) which form a proportion of the area of from 3 to 15% to the whole peak area, was also determined similarly in such a manner that such a peak in the chromatogram was selected, perpendiculars were drawn from valleys between adjacent peaks to the base line, and a peak at a portion surrounded by the base line and the perpendiculars was employed to calculate the molecular weight distribution.

The content of the branched block copolymer in the block copolymer mixture containing a branched block copolymer was determined by means of gel permeation chromatogram in the following method.

First, with respect to peaks corresponding to linear block copolymers S1-B, S2-B and S3-B prior to coupling, the peak top molecular weights M4, M5 and M6 of components corresponding to S1-B, S2-B and S3-B obtained from a gel permeation chromatogram of the sampled product after completion of the fourth stage polymerization was measured.

Then, in the gel permeation chromatogram of the block copolymer mixture containing a branched block copolymer, peaks having molecular weights of M4, M5 and M6 were selected to identify peaks corresponding to S1-B, S2-B and S3-B.

Each of the peak areas of the respective identified peaks of components corresponding to S1-B, S2-B and S3-B was obtained in accordance with the above method by drawing perpendiculars from valleys between adjacent peaks to the base line to calculate the area of the peak at a portion surrounded by the base line and perpendiculars.

Further, the sum of the respective peak areas was calculated, and the value was subtracted from the whole peak area to obtain the peak area of the branched block copolymer in the block copolymer mixture in the gel permeation chromatogram. The proportion of the peak area of the branched block copolymer thus obtained to the whole peak area was obtained by percentage, to obtain the content of the branched block copolymer in the block copolymer mixture containing a branched block copolymer by mass %. The same calculation was carried out with respect to a block copolymer mixture containing another branched block copolymer.

Comparative Example 6

A jacketed stainless steel polymerization tank equipped with a stirrer, having an internal volume of 10 L, was washed with cyclohexane, the air in the polymerization tank was replaced with nitrogen, and then in a nitrogen gas atmosphere, 4,329 g of cyclohexane dehydrated to a moisture content of at most 7 ppm, containing 150 ppm of tetrahydrofuran, was charged into the polymerization tank, and then 614 g of styrene dehydrated to a moisture content of at most 7 ppm was added. After the internal temperature was increased to 50° C., 14.6 ml of a n-butyllithium 10 mass % cyclohexane solution was added, and polymerization was carried out for 20 minutes so that the maximum temperature would not exceed 120° C. (first stage polymerization).

Then, at a constant internal temperature of 50° C., 15.2 ml of a n-butyllithium 10 mass % cyclohexane solution and then 272 g of styrene dehydrated to a moisture content of at most 7 ppm were added, and polymerization was carried out for 20 minutes so that the maximum temperature would not exceed 120° C. (second stage polymerization).

After completion of the second stage polymerization, sampling was carried out, and the sampled polymer liquid was diluted with toluene, and the obtained solution was poured into a large amount of methanol to precipitate a polymer content, which was vacuum dried, and the obtained product was measured by GPC under the measurement conditions 1. As a result, two types of polymer chains S4 and S5 were present in the sampled product, and where their peak top molecular weights are represented by M13 and M14, they were 46,000 and 10,600, respectively. Further, the molecular weight distribution Mw/Mn of a mixture of S4 and S5 was 1.60.

Further, after the internal temperature was increased to 80° C., 265 g of butadiene dehydrated by being passed through molecular sieves was added, and polymerization was carried out for 20 minutes so that the maximum temperature would not exceed 120° C. (third stage polymerization).

After completion of the third stage polymerization, sampling was carried out, and a sampled polymer liquid was diluted with toluene, and the obtained solution was poured into a large amount of methanol to precipitate a polymer content, which was vacuum dried, and the obtained product was measured by GPC under the measurement conditions 2. As a result, two types of polymer chains S4-B and S5-B were present in the sampled product, and where their peak top molecular weights are represented by M15 and M16, M15 and M16 were 63,000 and 25,000, respectively.

After completion of the successive polymerization, at a constant internal temperature of 80° C., a solution having 2.9 g of a coupling agent Vikoflex 7170 (manufactured by ATOFINA CHEMICALS) comprising an epoxidized soybean oil dissolved in 10 ml of cyclohexane was added, and coupling reaction was carried out for 30 minutes (coupling step).

Finally, all polymer active terminals were inactivated with methanol. The polymer solution was diluted with cyclohexane, and the obtained solution was poured into a large amount of methanol to precipitate a polymer content, which was vacuum dried to obtain a powdery polymer. This polymer was measured by GPC under the measurement conditions 2, whereupon the peak top molecular weight of a component providing the maximum peak of the polymer was 151,000, and the molecular weight distribution of a peak at which the peak top molecular weight becomes minimum among peaks (a) at which the peak top molecular weight is from 20,000 to 50,000 and (b) which form a proportion of the area of from 3 to 15% to the whole peak area, was 1.007. Further, in a gel permeation chromatogram of the block copolymer mixture containing a branched block copolymer, the proportion of the area of a peak at which the peak top molecular weight becomes maximum among peaks at which the peak top molecular weight is from 200,000 to 380,000, was 3.7% to the whole peak area.

Further, the proportion of the number of moles of an open epoxy group residue present in an epoxidized oil residue in the block copolymer mixture containing a branched block copolymer, to the total number of moles of epoxy groups and the open epoxy group residue present in the epoxidized oil residue, was 0.34.

Finally, 0.2 part by mass of 2,4-bis[(octylthio)methyl]-o-cresol as a stabilizer was added to 100 parts by mass of the powdery polymer, the powdery polymer was supplied to a 20 mm single screw extruder, and a molten strand was withdrawn from a die at 210° C., cooled with water and cut by a cutter to obtain resin pellets. The charged amounts are shown in Table 6, various analyzed values are shown in Tables 11, 12 and 9, and results of evaluation of solid physical properties are shown in Table 10.

TABLE 11

Analyzed values of polymer content formed by the end of second stage polymerization

| | Comparative Example 6 |
|---|---|
| GPC measurement conditions | 1 |
| Peak top molecular weight M13 | 46000 |
| Peak top molecular weight M14 | 10600 |
| Molar ratio of component S2 | 44.1 |
| Molecular weight distribution (Mw/Mn) | 1.60 |

TABLE 12

Analyzed values of polymer content formed by the end of third stage polymerization

| | Comparative Example 6 |
|---|---|
| GPC measurement conditions | 2 |
| Peak top molecular weight M15 | 63000 |
| Peak top molecular weight M16 | 25000 |
| Number average molecular weight of polymer block comprising conjugated diene as monomer units | 8000 |

Examples 8 to 11 and Comparative Examples 7 to 9

Each of the block copolymer mixtures containing a branched block copolymer obtained in Examples 4 to 7 and Comparative Examples 4 to 6 and a general purpose polystyrene (G14L, manufactured by TOYO STYRENE CO., LTD.) were blended in a weight ratio of block copolymer mixture containing a branched block copolymer/general purpose polystyrene of 6/4 and supplied to a 20 mm single screw extruder, and a molten strand was withdrawn from a die at 230° C., cooled with water and cut by a cutter to obtain resin pellets. Then, physical properties were evaluated in the same manner as in Example 1. The results are shown in Table 13.

TABLE 13

Results of measurement of physical properties of blended product of block copolymer mixture containing a branched block copolymer and general purpose polystyrene

| | Ex. 8 | Ex. 9 | Ex. 10 | Ex. 11 | Comp. Ex. 7 | Comp. Ex. 8 | Comp. Ex. 9 |
|---|---|---|---|---|---|---|---|
| Branched block copolymer used | Polymer of Ex. 4 | Polymer of Ex. 5 | Polymer of Ex. 6 | Polymer of Ex. 7 | Polymer of Comp. Ex. 4 | Polymer of Comp. Ex. 5 | Polymer of Comp. Ex. 6 |
| MFR (g/10 min) | 7.4 | 8.8 | 10.5 | 15 | 7 | 3.5 | 3.5 |
| Haze (%) | 8.9 | 10.3 | 7 | 12 | 5.7 | 8.1 | 18 |
| Total luminous transmittance (%) | 80 | 80 | 81.2 | 78 | 83 | 81 | 72 |
| Total absorbed energy (J) | 16.9 | 17 | 13.6 | 13 | 1 | 3.5 | 1.4 |
| Charpy impact strength (kJ/m) | 1.3 | 1.4 | 1.3 | 7.1 | 1.3 | 1.8 | 0.9 |

INDUSTRIAL APPLICABILITY

The block copolymer mixture containing a branched block copolymer of the present invention is useful for applications to which a conventional block copolymer is utilized, such as modifiers for various thermoplastic resins and thermosetting resins, raw materials for footwear, raw materials for tackifiers and adhesives, modifiers for asphalt, raw materials for wire cables and modifiers for vulcanized rubbers. Particularly, a composition obtained by blending the block copolymer mixture containing a branched block copolymer of the present invention with a thermoplastic resin, is useful as a raw material for sheets and films, and is useful for food packaging containers and farther for commodity packaging and laminate sheets and films, by virtue of its excellent transparency, impact resistance and low temperature characteristics.

The invention claimed is:

1. A block copolymer mixture comprising a branched block copolymer as the main component, said block copolymer mixture comprises from 65 to 75 mass % of a vinyl aromatic hydrocarbon and from 25 to 35 mass % of a conjugated diene as monomer units, a linear block copolymer prior to coupling is formed by coupling living active site represented by the following formulae:

S1-B—Li

S2-B—Li

S3-B—Li, wherein each of S1, S2 and S3 is a polymer block consisting of a vinyl aromatic hydrocarbon as monomer units, B is a polymer block consisting of a conjugated diene as monomer units, and Li is a living active site comprising lithium, and the number average molecular weights are S1>S2>S3, and further, (1) molecular weight distribution (Mw/Mn) of a mixture of the polymer blocks S1, S2 and S3 each comprising a vinyl aromatic hydrocarbon as monomer units is within a range of from 3.25 to 6, and (2) in a gel permeation chromatogram of the mixture of the polymer blocks S1, S2 and S3, M1/M3 is within a range of from 13 to 25, and M2/M3 is within a range of from 2 to 4, where M1, M2 and M3 are peak top molecular weights of components corresponding to S1, S2 and S3, respectively, wherein all monomer units are charged as pure monomers and each charge is completely polymerized before the addition of the subsequent charge, and in the gel permeation chromatogram of the mixture of the polymer blocks S1, S2 and S3, the peak top molecular weight M1 corresponding to S1 is within a range of from 80,000 to 220,000, the peak top molecular weight M2 corresponding to S2 is within a range of from 14,000 to 25,000, and the peak top molecular weight M3 corresponding to S3 is within a range of from 3,000 to 12,000.

2. The block copolymer mixture according to claim 1, which comprises the branched block copolymer in an amount of from 65 to 90 mass %.

3. The block copolymer mixture according to claim 1, wherein the proportion of the number of moles of S1 to the total number of moles of S1, S2 and S3 is within a range of from 2 to 30 mol %.

4. The block copolymer mixture according to claim 1, wherein in the gel permeation chromatogram of the block copolymer mixture comprising a branched block copolymer, the molecular weight distribution (Mw/Mn) of the peak at which the peak top molecular weight becomes minimum among peaks which satisfy the following (a) and (b), is less than 1.03:

(a) the peak top molecular weight is within a range of from 20,000 to 50,000, and (b) the proportion of the area is within a range of from 3 to 15% to the whole peak area.

5. The block copolymer mixture according to claim 1, wherein in the gel permeation chromatogram of the block copolymer mixture containing a branched block copolymer, the proportion of the area of the peak at which the peak top molecular weight becomes maximum among peaks at which the peak top molecular weight is within a range of from 200,000 to 380,000, is from 2 to 10% to the whole peak area.

6. The block copolymer mixture according to claim 1, wherein in the gel permeation chromatogram of a mixture of copolymers S1-B, S2-B and S3-B, each comprising the polymer block comprising the vinyl aromatic hydrocarbon as monomer units and the polymer block comprising the conjugated diene as monomer units, M4/M6 is within a range of from 4.5 to 9, and M5/M6 is within a range of from 1.3 to 1.8, where M4, M5 and M6 are peak top molecular weights of components corresponding to S1-B, S2-B and S3-B, respectively.

7. The block copolymer mixture according to claim 1, wherein a component providing the maximum peak area in the gel permeation chromatogram of the block copolymer mixture comprising the branched block copolymer, has a peak top molecular weight of from 170,000 to 300,000.

8. The block copolymer mixture according to claim 1, which is formed by coupling using an epoxidized oil.

9. The block copolymer mixture according to claim 8, wherein the epoxidized oil is epoxidized soybean oil.

10. The block copolymer mixture according to claim 8, wherein the proportion of the number of moles of an open epoxy group residue present in an epoxidized oil residue in the branched block copolymer is less than 0.7 to the total number of moles of epoxy groups and the open epoxy group residue present in the epoxidized oil residue.

11. A thermoplastic resin composition comprising the block copolymer mixture as defined in claim 1 and a thermoplastic resin other than the block copolymer mixture.

12. The thermoplastic resin composition according to claim 11, wherein the thermoplastic resin is a styrene resin.

13. The block copolymer mixture according to claim 1, wherein said linear blocks S1-B—Li, S2-B—Li, and S3-B—Li are obtained by charging the vinyl aromatic hydrocarbon three times followed by charging the conjugated diene.

14. A block copolymer mixture comprising a branched block copolymer as the main component, said block copolymer mixture comprises from 65 to 75 mass % of a vinyl aromatic hydrocarbon and from 25 to 35 mass % of a conjugated diene as monomer units, a linear block copolymer prior to coupling is formed by coupling living active site represented by the following formulae:

S1-B—Li

S2-B—Li

S3-B—Li, wherein each of S1, S2 and S3 is a polymer block consisting of a vinyl aromatic hydrocarbon as monomer units, B is a polymer block consisting of a conjugated diene as monomer units, and Li is a living active site comprising lithium, and the number average molecular weights are S1>S2>S3, and further, (1) molecular weight distribution (Mw/Mn) of a mixture of the polymer blocks S1, S2 and S3 each comprising a vinyl aromatic hydrocarbon as monomer units is within a range of from 3.25 to 6, and (2) in a gel permeation chromatogram of the mixture of the polymer blocks S1, S2 and S3, M1/M3 is within a range of from 13 to 25, and M2/M3 is within a range of from 2 to 4, where M1, M2 and M3 are peak top molecular weights of components corresponding to S1, S2 and S3, respectively, wherein each polymer block S1, S2, and S3 consisting of the vinyl aromatic hydrocarbon as monomer units is directly attached to the conjugated diene polymer block B; the polymer blocks S1, S2, and S3 do not contain the conjugated diene polymer block B; and the conjugated diene polymer block B does not contain the polymer blocks 51, S2, and S3 consisting of the vinyl aromatic hydrocarbon as monomer units, and in the gel permeation chromatogram of the mixture of the polymer blocks S1, S2 and S3, the peak top molecular weight M1 corresponding to S1 is within a range of from 80,000 to 220,000, the peak top molecular weight M2 corresponding to S2 is within a range of from 14,000 to 25,000, and the peak top molecular weight M3 corresponding to S3 is within a range of from 3,000 to 12,000.

15. The block copolymer mixture according to claim 14, which comprises the branched block copolymer in an amount of from 65 to 90 mass %.

16. The block copolymer mixture according to claim 14, wherein the proportion of the number of moles of S1 to the total number of moles of S1, S2 and S3 is within a range of from 2 to 30 mol %.

17. The block copolymer mixture according to claim 14, wherein in the gel permeation chromatogram of the block copolymer mixture comprising a branched block copolymer, the molecular weight distribution (Mw/Mn) of the peak at which the peak top molecular weight becomes minimum among peaks which satisfy the following (a) and (b), is less than 1.03:
(a) the peak top molecular weight is within a range of from 20,000 to 50,000, and
(b) the proportion of the area is within a range of from 3 to 15% to the whole peak area.

18. The block copolymer mixture according to claim 14, wherein in the gel permeation chromatogram of the block copolymer mixture containing a branched block copolymer, the proportion of the area of the peak at which the peak top molecular weight becomes maximum among peaks at which the peak top molecular weight is within a range of from 200,000 to 380,000, is from 2 to 10% to the whole peak area.

19. The block copolymer mixture according to claim 14, wherein in the gel permeation chromatogram of a mixture of copolymers S1-B, S2-B and S3-B, each comprising the polymer block comprising the vinyl aromatic hydrocarbon as monomer units and the polymer block comprising the conjugated diene as monomer units, M4/M6 is within a range of from 4.5 to 9, and M5/M6 is within a range of from 1.3 to 1.8, where M4, M5 and M6 are peak top molecular weights of components corresponding to S1-B, S2-B and S3-B, respectively.

20. The block copolymer mixture according to claim 14, wherein a component providing the maximum peak area in the gel permeation chromatogram of the block copolymer mixture comprising the branched block copolymer, has a peak top molecular weight of from 170,000 to 300,000.

21. The block copolymer mixture according to claim 14, which is formed by coupling using an epoxidized oil.

22. The block copolymer mixture according to claim 21, wherein the epoxidized oil is epoxidized soybean oil.

23. The block copolymer mixture according to claim 21, wherein the proportion of the number of moles of an open epoxy group residue present in an epoxidized oil residue in the branched block copolymer is less than 0.7 to the total number of moles of epoxy groups and the open epoxy group residue present in the epoxidized oil residue.

24. A thermoplastic resin composition comprising the block copolymer mixture as defined in claim 14 and a thermoplastic resin other than the block copolymer mixture.

25. The thermoplastic resin composition according to claim 24, wherein the thermoplastic resin is a styrene resin.

26. The block copolymer mixture according to claim 14, wherein said linear blocks S1-B—Li, S2-B—Li, and S3-B—Li are obtained by charging the vinyl aromatic hydrocarbon three times followed by charging the conjugated diene.

* * * * *